(12) United States Patent
Sato et al.

(10) Patent No.: US 8,293,132 B2
(45) Date of Patent: Oct. 23, 2012

(54) PHENALKAMINE AND SALTED AMINE BLENDS AS CURING AGENTS FOR EPOXY RESINS

(75) Inventors: Setsuo Sato, Jacarei-Sao Paulo (BR); Shailesh C Shah, Dresher, PA (US); Ramiro Carielo Bueno, Jacarei-SP (BR); Robert M Moon, Payson, UT (US); Arnaldo Ferreira, Jacarei (BR)

(73) Assignee: Cognis IP Management GmbH, Duesseldorf (DE)

( * ) Notice: Subject to any disclaimer, the term of this patent is extended or adjusted under 35 U.S.C. 154(b) by 269 days.

(21) Appl. No.: 12/809,321

(22) PCT Filed: Dec. 10, 2008

(86) PCT No.: PCT/EP2008/010453
§ 371 (c)(1),
(2), (4) Date: Jun. 18, 2010

(87) PCT Pub. No.: WO2009/080209
PCT Pub. Date: Jul. 2, 2009

(65) Prior Publication Data
US 2010/0286345 A1 Nov. 11, 2010

Related U.S. Application Data

(60) Provisional application No. 61/014,823, filed on Dec. 19, 2007.

(51) Int. Cl.
*C08G 59/56* (2006.01)
*C08L 63/00* (2006.01)
*C09D 163/00* (2006.01)
*C09K 3/00* (2006.01)

(52) U.S. Cl. .................. 252/182.26; 525/481; 525/523; 525/526; 528/114

(58) Field of Classification Search .................. None
See application file for complete search history.

(56) References Cited

U.S. PATENT DOCUMENTS

| 3,718,618 | A | * | 2/1973 | Wagner et al. | 528/107 |
| 4,195,001 | A | * | 3/1980 | Lytton | 523/177 |
| 4,304,700 | A | * | 12/1981 | Shimp et al. | 524/403 |
| 4,374,879 | A | * | 2/1983 | Roberts et al. | 428/34.7 |
| 4,751,278 | A | | 6/1988 | Brytus | |
| 5,075,034 | A | * | 12/1991 | Wanthal | 252/511 |
| 6,229,054 | B1 | | 5/2001 | Dai et al. | |
| 6,262,148 | B1 | | 7/2001 | Cheng et al. | |

* cited by examiner

*Primary Examiner* — Robert Sellers
(74) *Attorney, Agent, or Firm* — Diehl Servilla LLC

(57) ABSTRACT

The invention relates to a curing agent for epoxy resins, comprising a phenalkamine blended with a salted polyamine or a salted polyamine-epoxy adduct to form a curing agent for an epoxy resin, wherein at least one-third of the primary amine groups of the salted polyamine or the salted polyamine-epoxy adduct are blocked.

5 Claims, No Drawings

PHENALKAMINE AND SALTED AMINE BLENDS AS CURING AGENTS FOR EPOXY RESINS

CROSS REFERENCE TO RELATED APPLICATIONS

This application is the National Stage entry of PCT/EP2008/010453, filed Dec. 10, 2008, which claims priority to U.S. Provisional Application No. 61/014,823, filed Dec. 19, 2007, both of which are incorporated herein by reference in their entireties.

FIELD OF THE INVENTION

The invention relates generally to phenalkamine and salted amine blends, and more particularly, to phenalkamine and salted amine blends as epoxy resin curing agents suitable for curing epoxy resins under low temperature curing conditions.

BACKGROUND OF THE INVENTION

Phenalkamines are epoxy hardening agents comprised of cardanol, formaldehyde, and an organic diamine. Cardanol is produced from Cashew Nutshell Liquid (CNSL). Phenalkamine may be produced via a Mannich reaction to produce a low molecular weight polymer by condensing one mol of alkyl phenol, two mols of formaldehyde and two mols of a polyamine. The polyamine may be aromatic or aliphatic. Commercially, ethylene diamine and diethylenetriamine are used to produce Cardolite NC541 and Cardolite NC 540, respectively.

Phenalkamines are products of the reaction (condensation products) of cardanol (I), which, chemically, is a $C_{15}$ alkylphenol and a major constituent of the oil obtainable from CNSL, with aliphatic (primary or secondary) amines and formaldehyde.

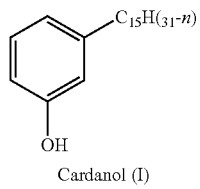

Cardanol (I)

where n=0, 2, 4, 6 (2 times the number of double bonds).

The condensation step is carried out by first adding formaldehyde to the reaction, in the presence of at least a catalytic amount of an amine, thereby producing an alkyl $C_{15}$ phenol methylol pre-polymer, followed by condensation with a polyamine, which releases water. The temperature during synthesis should be less than 90° C. to minimize color development.

Further information on phenalkamines can be found in the publication: Zhishen Dat et al., "Phenalkamines: Multipurpose Epoxy Curing Agent"; Cardolite Corporation, Newark, N.J., USA; Reprint EPI-ERF Conference, September 1994.

Crude CNSL predominantly contains anacardic acid (II). The distillation of CNSL in the presence of acid gives a composition which mainly contains cardanol and, as a secondary product, cardol (III), see, for example, U.S. Pat. No. 6,262,148, and U.S. Pat. No. 6,229,054. It has been found that the distillation of crude CNSL provides a composition which mainly contains cardanol and, as a secondary product, cardol and small quantities of 2-methyl cardol and anacardic acid.

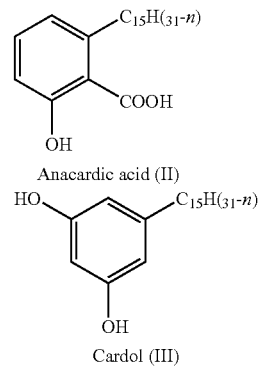

Anacardic acid (II)

Cardol (III)

The cardanol/cardol mixture thus obtained has three technical disadvantages: (1) production by distillation from crude CNSL involves losses of part of the cardanol through polymerization so that, ultimately, the yield of cardanol in the distillate is only 50-60%; (2) the initially pale yellowish cardanol/cardol mixture changes during storage, rapidly turning brown in color, which is attributed to the presence of cardol; and (3) products ensuing from the cardanol/cardol mixture also undergo unwanted changes in color during storage.

The resulting product is effective as an epoxy hardener, but it has a dark color, based on the Gardner scale, of greater than 12. The dark color in the existing product is due to impurities, including cardols (a di-hydroxy alkyl phenol) which lead to rapid polymerization and oxidation reactions, which generate precursor color bodies, either during storage or during phenalkamine manufacturing. Current manufacturing processes do not separate the cardol impurities at a satisfactory level in which no darkening occurs. In addition, at low temperatures, i.e., 0° Celsius, the curing speed is slow.

There remains a need for epoxy resin curing agents that effectively cure at reduced temperatures.

DETAILED DESCRIPTION OF PREFERRED EMBODIMENTS

Briefly described, according to an aspect of the invention, a curing agent for epoxy resins includes: a phenalkamine blended with a salted polyamine or a salted polyamine-epoxy adduct to form a curing agent for an epoxy resin, wherein at least one-third of the primary amine groups of the salted polyamine or the salted polyamine-epoxy adduct are blocked.

According to another aspect of the invention, a method for making a curing agent for epoxy resins, includes the steps of: providing a phenalkamine, and blending the phenalkamine with a salted polyamine or a salted polyamine-epoxy adduct to form a curing agent for an epoxy resin, wherein at least one-third of the primary amine groups of the salted polyamine or the salted polyamine-epoxy adduct are blocked.

According to another aspect of the invention, a method for curing epoxy resins at reduced temperatures includes the step of: adding the curing agent described herein to an epoxy resin, wherein curing occurs at temperatures between about −10° C. to about 25° C.

As used herein, the terms "comprises", "comprising", "includes", "including", "has", "having", or any other variation thereof, mean that other elements or components may be included. For example, a process, method, article, or apparatus that comprises a list of elements is not necessarily limited to the expressly listed elements, but may include other elements inherent, or not expressly listed, to such process, method, article, or apparatus. In addition, unless expressly stated to the contrary, the term "or" refers to an inclusive "or" and not to an exclusive "or". For example, the condition A "or" B is satisfied by any one of the following: A is true (included) and B is false (omitted); A is false (omitted) and B is true (included); and both A and B are true (both included).

The terms "a" or "an" as used herein are to describe elements and components of the invention. This is done for convenience to the reader and to provide a general sense of the invention. The use of "a" or "an" should be understood to include one or at least one. In addition, the singular also includes the plural, unless indicated to the contrary. For example, reference to a composition containing "a compound" includes at least one or more compounds.

According to an aspect of the invention, the phenalkamines are prepared with substantially pure cardanol. The cardanol is prepared by substantially removing oligomers (with molecular weights of 1,000 to 3,000) from the crude CNSL by distillation, including simple short-path distillation (rapid completion of process to suppress or minimize secondary processes, such as polymerization or oxidation). During distillation, about 15% to 20% by weight of the CNSL is removed in the form of oligomers.

Short-path distillation may be conducted as follows. Step 1: First runnings of 2% to 5% by weight (based on the CNSL used) are removed at temperatures of 150° C. to 200° C. and at pressures of 1-5 mmHg, followed by a main fraction at temperatures of 220° C. to 260° C. and pressures of 1-5 mmHg. This main fraction (the distillate from step 1) is referred to as crude cardanol. Step 2: The distillate from Step 1 is reacted with boric acid ($H_3BO_3$), to convert the dihydric phenols present into the corresponding boric acid esters. The molar ratio of crude cardanol from Step 1 to boric acid may be adjusted to a ratio of 3:0.07 to 3:0.1. The reaction temperature may be adjusted to a range of about 120° C. to about 150° C. The reaction time is between 30 and 90 minutes. Water formed during the reaction may be continuously removed from the system. The amount of boric acid used is a stoichiometric quantity in relation to the cardols present in the crude cardanol from Step 1. Step 3: The mixture from Step 2 is subjected to distillation in which the low-boiling constituents are removed, and the relatively high molecular weight boric acid esters remain in the residue. Distillation may be conducted in vacuo under the conditions of a short-path distillation or a conventional fractional distillation.

If desired, the main fraction of Step 3 may be treated with small quantities of adsorbents and/or reducing agents. Examples of suitable reducing agents include, but are not limited to: sodium hydrosulfite ($Na_2S_2O_4$), sodium metabisulfite ($Na_2S_2O_5$), sodium borohydride ($NaBH_4$), lithium aluminum hydride ($LiAlH_4$), tin chloride ($SnCl_2$) or magnesium silicate. Examples of suitable adsorbents include, but are not limited to, magnesium silicate, or chemically-equivalent compounds. The quantity of adsorbents or reducing agents used may be from 0.1% to 5% by weight (based on the main fraction obtained in Step 3).

Alternatively, the distillate in Step 2 may be reacted with acetic anhydride, to bind unwanted chromophores. The quantity of acetic anhydride used may be from about 1% to 5% by weight, based on the distillate, and the reaction temperature may be adjusted to about 50° C. to 70° C. The acetic acid formed may be continuously removed (stripped off) from the system. The resulting mixture is subjected to fractional distillation.

A fractionating column with more than 6 theoretical plates may be used for fractional distillation. In one embodiment, a typical fractionating column with a head, rectifying section, feed plate, stripping section and bottom is used for the continuous fractional distillation. The cardanols are removed at the upper end (head) of the column, and the cardols at the lower end (bottom). In order to avoid overheating, the distillation is carried out at temperatures ranging from 180° C.-210° C./0.5-1.5 mmHg at the head of the fractionating column and 230° C.-260° C./1.5-3 mmHg at the lower end of the column. The product stream at the lower end of the column contains a fraction which is rich in cardols and contains only small amounts of cardanols and acetic acid esters.

The cardanols used according to an aspect of the invention have a purity of greater than 98%, where cardols are present at less than 0.2%. By using high-purity cardanols that are substantially free of cardols, in combination with a salted polyamine or a polyamine-epoxy adduct, viscosity is lower due to the reduced quantity of cardols present.

According to an aspect of the invention, the polyamines may be any amine having two or more primary amine functionalities, including compounds having secondary amine functionalities in addition to the two or more primary amine groups. Suitable diamines and polyamines are represented by the formula:

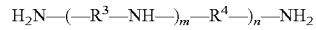

$$H_2N-(-R^3-NH-)_m-R^4-)_n-NH_2$$

wherein $R^3$ and $R^4$ are divalent hydrocarbyl groups, with 2 to 20 carbon atoms, and m and n are integers ranging from 0 to 5, wherein m+n is equal to at least 1. The hydrocarbyl groups may be branched or linear alkylene groups, cycloaliphatic groups or contain aromatic groups, provided the attached amines are primary or secondary aliphatic amines.

Examples of diamines and polyamines include, but are not limited to: ethyleneamines such as 1,2-ethanediamine (EDA), N-(2-aminoethyl)-1,2-ethanediamine (DETA), N,N-bis(2-amino-ethyl)-1,2-ethanediamine (TETA), N-(2-amino-ethyl)-N'-[(2-amino-ethyl)amino-ethyl]-1,2-ethanediamine (TEPA), aminoethylpiperazine, and higher polyethylenepolyamines, 1,3-benzenedimethanamine (MXDA-metaxylylene diamine); 1,3-cyclohexanedimethanamine (1,3-BAC); 1,2-diaminocyclohexane (DACH); norbornanediamine; isophorone diamine; 5-amino-1,3,3-trimethylcyclohexanemethanamine (IPDA); trimethylhexamethylenediamine (TMD); 1,3-pentanediamine (DYTEK™ EP); 2-methyl-1,5-pentanediamine (DYTEK™ A); 1,6-hexanediamine (HMDA) and 4,4'-diaminodicyclohexylmethane (PACM).

Epoxy-functional materials suitable for preparing the polyamine-epoxy adducts include, but are not limited to: Bisphenol A epoxy resins, including the diglycidyl ether of Bisphenol-A with epoxy equivalent weights ranging from 170-525; Bisphenol F epoxy resins, including the diglycidyl ether of Bisphenol F with epoxy equivalent weights ranging from 156-190; Bisphenol F epoxy novolac resins; cresol epoxy novolac resins; and various mono-, di- and tri-functional reactive epoxy "diluents," such as butyl glycidyl ether, $C_{8-10}$ alkyl glycidyl ethers, $C_{12-13}$ alkyl glycidyl ethers, $C_{12-14}$ alkyl glycidyl ethers, cresyl glycidyl ether, 1,4-butanediol diglycidyl ether, neopentyl glycol diglycidyl ether, and resorcinol diglycidyl ether. The epoxy-functional materials are reacted with a diamine or polyamine, to form a polyamine-epoxy adduct. The reaction can be conducted at a temperature of from 20° C. to 80° C. or higher, depending on the selection of reactants. The adducts may be prepared by conventional methods.

Salted amines useful as epoxy curing agent modifiers for the phenalkamines are those where at least one-third of the primary amine groups are blocked by reacting with an epoxy, or are "salted" by adding an acidic hydrogen donor group. This modification of an amine-functional epoxy curing agent has been found to be very resistant to reaction with atmospheric carbon dioxide and moisture to produce the bicarbonates or carbamates characterized as the undesirable amine "blush". These curing agents also exhibit rapid cure response when reacted with epoxy resins and other epoxy-functional materials, and that by selecting the proper components, the systems exhibit excellent cure characteristics at significantly lower temperatures than previously attained. If an amine adduct produced by the reaction of diamines and/or polylamines with an epoxy resin or other epoxy-functional materials is further reacted with sufficient acidic hydrogen donor groups to block or "salt", at least one-third, and, alternatively, may be about one-half, of most or all of the remaining primary amine groups, the curing agent thus produced also does not exhibit reaction with atmospheric carbon dioxide and moisture, and also exhibits excellent low temperature cure characteristics.

The curing agents of the invention are present in an amount effective to cure the epoxy resin. Due to the rapid cure rates provided by curing agents of the invention, accelerators are not required, but may be utilized to further increase the cure rate of the epoxy resin system. Various amine-compatible accelerators can be used, provided the accelerators are soluble in the curing agent. Examples of suitable accelerators include, but are not limited to: 2,4,6-tris-(dimethylaminomethyl)phenol, N,N-di-ethylethanolamine, and N,N-dimethylbenzylamine. The concentrations of the accelerators may be from 0.1% to 10%, based on the weight of the curing agent.

A curable epoxy resin may have a 1,2-epoxy equivalency of one or more, and preferably, on the average, about 1.5 or more epoxide groups per molecule. The epoxy resin may be saturated or unsaturated, linear or branched, aliphatic, cycloaliphatic, aromatic or heterocyclic, and may also have substituents, such as bromine, which do not materially interfere with the curing reaction. The epoxy resin may be monomeric or polymeric, liquid or solid, but is preferably liquid at room temperature.

Suitable epoxy resins include glycidyl ethers prepared by reacting epichlorohydrin with a compound containing at least one, and preferably two or more, hydroxyl groups carried out under alkaline reaction conditions. Examples of suitable epoxy resins include, but are not limited to: polyglycidyl ethers of polyhydric phenols, epoxy novolacs or similar glycidated polyphenolic resins, polyglycidyl ethers of alcohols, glycols or polyglycols, and polyglycidyl esters of polycarboxylic acids.

A particularly suitable epoxy resin is based on a polyglycidyl ether of a polyhydric phenol. Polyglycidyl ethers of polyhydric phenols can be produced, for example, by reacting an epihalohydrin with a polyhydric phenol in the presence of an alkali. Examples of suitable polyhydric phenols include, but are not limited to: 2,2-bis(4-hydroxyphenyl)propane (Bisphenol-A); 2,2-bis(4-hydroxy-3-tert-butylphenyl)propane; 1,1-bis(4-hydroxyphenyl)ethane; 1,1-bis(4-hydroxyphenyl)isobutane; bis(2-hydroxy-1-naphthyl)methane; 1,5-dihydroxynaphthalene; and 1,1-bis(4-hydroxy-3-alkylphenyl)ethane. Suitable polyhydric phenols can also be obtained from the reaction of phenol with aldehydes such as formaldehyde (Bisphenol-F). Fusion products of these polyglycidyl ethers of polyhydric phenols with phenolic compounds such as Bisphenol-A are also suitable as epoxy resins, such as those described in U.S. Pat. No. 3,477,990 and U.S. Pat. No. 4,734,468. Commercial examples of preferred epoxy resins include, for example, EPON® Resins 862, 828, 826, 825 and 1001 available from Hexion Specialty Chemicals and commercially available epoxy resins from Dow Chemical Company such as DER™ 330; 331; 354; 661; and 671.

The epoxy resins may also be blended with a glycidyl ether of an aliphatic or aromatic alcohol, glycol or polyglycol, or a glycidyl ester of a monocarboxylic acid. Examples include, but are not limited to: butyl glycidyl ether, phenyl glycidyl ether, cresyl glycidyl ether, 1,4-butanediol diglycidyl ether, and the glycidyl ester of neodecanoic acid. The glycidyl ethers and esters may be blended with an epoxy resin in amount of from 1% to 50% in order to affect wetting characteristics, viscosity, flexibility, adhesion characteristics, and other properties. EPON® Resins 815, 813, and 8132 (available from Hexion Specialty Chemicals) and DER™ 324 (available from Dow Chemical Company) are examples of epoxy resins containing such modifiers.

Further to facilitate handling or application or use in various environments, the curing agent or the epoxy resin system can be diluted with minor amounts of compatible solvents, including, but not limited to, aliphatic or aromatic hydrocarbons, alcohols, glycol ethers, ketones, and esters.

The components of the curing agent according to an aspect of the invention, i.e., phenalkamine and salted amine, may be present in ratios of 95:5; 90:10; and 80:20, depending upon the desired application.

The curing agent may contain auxiliaries and additives, for example, flow control additives, antifoam agents, or anti-sag agents. Other additives may include pigments, reinforcing agents, fillers, elastomers, stabilizers, extenders, plasticizers, or flame retardants, depending upon the intended application. Other conventional additives that do not materially affect the basic characteristics and efficacy of the composition, may also be present.

The epoxy resin curing composition may be used in applications including, but not limited to: adhesives, coatings, flooring, casting, and encapsulants.

Advantageously, increasing the curing speed at ambient conditions allows for quick return to service of the substrate being coated with an epoxy system. Increasing the curing speed at low temperatures provides the ability to coat products under adverse environmental conditions and helps extend the paint season of an epoxy resin system. If such fast curing systems can also avoid blush, which is a white powdery coating on top of an epoxy film formed due to insoluble carbonate formed by reaction of free primary amines with carbon dioxide in the presence of moisture, then intercoat adhesion failures can also be avoided.

Unless otherwise defined, all technical and scientific terms used herein have the same meaning commonly understood by one of ordinary skill in the art to which the invention belongs. Although methods and materials similar or equivalent to those described herein can be used in the practice or testing of the invention, suitable methods and materials are described below. The materials, methods and examples are illustrative only, and are not intended to be limiting.

EXAMPLES

Example 1

Synthesis of Phenalkamine Using Diethylenetriamine (DETA)

A suitable reactor is charged with 5.60 mols of cardanol, and 0.58 mols of DETA.

Under agitation, and under a flow of nitrogen, a temperature of 45° C. is reached. Thereafter, 12.83 mols of formaldehyde are added over a period of about one hour, without exceeding a temperature limit of 70° C. The reaction is maintained for an additional 90 minutes. Thereafter, 10.70 mols of DETA are added slowly, while maintaining the temperature at 70° C. When the addition of DETA is complete, the reaction continues for an additional hour. Thereafter, the reaction mixture is heated to 85° C., under vacuum of up to 50 mm/HG to remove water and other lower boiling point materials. The reaction is kept under vacuum in the reactor until the water is removed. The reactor is allowed to cool and the phenalkamine is thereafter discharged.

Analytical Results:
Aspect: Clear, viscous liquid
Gardner: 6
Amine Value: 502 mgKOH/g
Viscosity at 25° C.: 910 cps Example 2

Synthesis of Salted Amine

A suitable reactor is charged with 5.5 g of salicylic acid (0.08 acid eq.), 27 g of Bisphenol A (0.24 acid eq.), 10 g of benzyl alcohol, and 51 g of methylxylene diamine (0.75 primary amine eq.). Under a flow of nitrogen, the mixture in the reactor is heated to a temperature of 60° C. and held for 15 minutes. 6.5 g of DER 331 (0.03 epoxy eq.-blocks primary amine) is slowly added, and the temperature is kept at 100° C. Upon completion of the addition of DER 331, the temperature is raised to 160° C., and maintained for one hour. The reactor is allowed to cool, and the epoxy curing agent is discharged.

Calculation:
Primary Amine fraction blocked or "salted"=(0.08+0.24+0.03)/0.75=0.47
Analytical Results:
Aspect: Clear liquid
Gardner: 1
Amine Value: 420 mgKOH/g
Viscosity at 25° C.: 3600 cps Example 3

950 grams of phenalkamine obtained from Example 1 was combined with 50 grams of the salted amine obtained from Example 2.

Example 4

900 grams of phenalkamine obtained from Example 1 was combined with 100 grams of the salted amine obtained from Example 2.

Example 5

800 grams of phenalkamine obtained from Example 1 was combined with 200 grams of the salted amine obtained from Example 2.

TABLE 1

|  | Control(Ex. 1) | Ex. 3 | Ex. 4 | Ex. 5 |
|---|---|---|---|---|
| Dry Time (hours) |  |  |  |  |
| 25° C. Surface Dry | 2.10 | 2.00 | 1.10 | 1.10 |
| 25° C. Set-to-Touch | 4.00 | 3.45 | 1.60 | 2.20 |
| 25° C. Dry-Through | 5.80 | 5.80 | 4.00 | 2.60 |
| 0° C. Surface Dry | 5.70 | 4.40 | 3.60 | 3.50 |
| 0° C. Set-to-Touch | 14.00 | 11.75 | 8.90 | 9.50 |
| 0° C. Dry-Through | 18.00 | 13.80 | 13.20 | 12.90 |
| Gel Time (minutes) |  |  |  |  |
| 0° C. | 28.0 | 25.50 | 23.00 | 18.00 |

The control in Table 1 is the phenalkamine of Example 1, and does not include the salted amine of Example 2. As illustrated by the above data, it can be seen that the addition of a salted amine to a phenalkamine, in various ratios, i.e., 95:5; 90:10; and 85:5, advantageously provides a curing agent with reduced dry time at 25° C., and also at 0° C. The dry times performance shows a major improvement at 25° C. with 55% reduction in through-cure time, a major factor in how quickly a coated part can be put back into service. The improvement is also seen at 0° C., which is indicative of the performance improvement in outdoor coating applications on bridges, tanks, pipelines and ships in cold climates.

What is claimed is:

1. A curing agent for epoxy resins, comprising at least one phenalkamine blended with at least one salted polyamine or salted polyamine-epoxy adduct to form a curing agent for an epoxy resin, wherein at least one-third of the primary amine groups of said salted polyamine or said salted polyamine-epoxy adduct are blocked.

2. The curing agent of claim 1, wherein about one-half of the primary amine groups are blocked.

3. A method for making a curing agent for epoxy resins, comprising the steps of:
    (a) providing at least one phenalkamine; and
    (b) blending said phenalkamine with at least one salted polyamine or salted polyamine-epoxy adduct to form a curing agent for an epoxy resin, wherein at least one-third of the primary amine groups of said salted polyamine or said salted polyamine-epoxy adduct are blocked.

4. The method of claim 3, wherein about one-half of the primary amine groups of said salted polyamine or said salted polyamine-epoxy adduct are blocked.

5. A method for curing epoxy resins at reduced temperatures, comprising adding the curing agent of claim 1 to an epoxy resin, wherein curing occurs at a temperature in the range of about −10° C. to about 25° C.

* * * * *